United States Patent Office 2,727,833
Patented Dec. 20, 1955

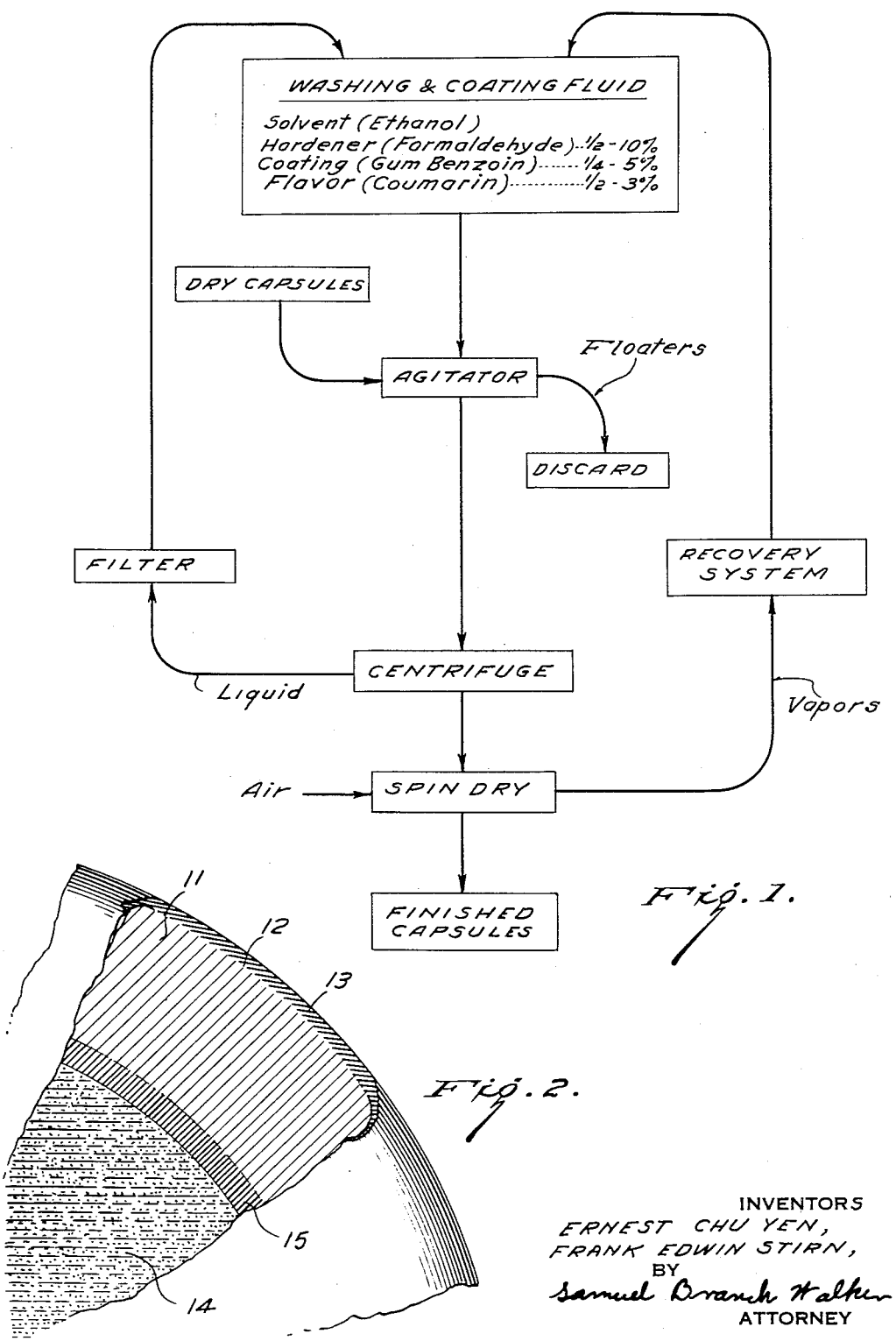

2,727,833

CAPSULE FINISHING PROCESS

Ernest Chu Yen and Frank Edwin Stirn, Pearl River, N. Y., assignors to American Cyanamid Company, New York, N. Y., a corporation of Maine Application November 3, 1950, Serial No. 193,947

8 Claims. (Cl. 117—94)

Our invention relates to a coated capsule, a coating composition, and a method of treating capsules, by which such a coated capsule results, whereby soft gelatin capsules are provided with a coating which renders them moisture resistant, non-tacky, easy to handle, and which coating protects the contents of the capsule.

In the past, soft gelatin capsules have been treated with material such as formaldehyde to render them insoluble in the gastric juices, and give them an enteric coating so that their contents are released in the lower portion of the digestive tract. Note for example the patent to Weyland 629,141. Capsules have also been coated with gum benzoin and other materials, as for example Patent 1,683,466 to Horigan which discloses an enteric coated capsule. Other capsules, as for example those of Lee 1,778,264 have been coated with shellac or other varnish. These particular capsules are used for poultry and the coating is broken in the gizzard of the fowl. Such coatings have been designed to be acid insoluble so that the capsule is protected until it reaches the intestine.

We have found that by a careful selection of coating and hardening materials, and applying them in accordance with our invention, it is possible to give to a soft gelatin capsule a hard, inert, moisture resistant coating which will protect the capsule in handling and protect the capsule and its contents from chance moisture but which coating does not substantially interfere with the release of the capsule contents in the stomach. At the same time, by our new process, it is possible to wash the capsules at the same time that they are coated, and additionally separate imperfectly filled capsules from the final product.

It is an object of our invention to (a) remove oil films, dirt, powder, lint and other foreign material from the surface of the capsules; (b) sterilize and partially harden the surface of the capsules; (c) separate any defective fills; (d) coat the capsule with a moisture resistant shell which may contain a flavor and an odor; (e) the hardening of the gelatin being simultaneous with the coating to cause the coating to stick more firmly thereto; (f) separate the excess coating material; (g) and air dry the capsule; or any desired combination of these steps.

While convenient if desired to apply such a heavy coating that the capsule will be insoluble in the stomach, it is also convenient to apply a sufficiently light coating that the dissolving time of the capsule is not undesirably greater than an unprotected capsule but yet the capsule be protected during storage and dispensing prior to its ultimate use.

The new capsule produced by our procedures has a marked advantage in having the coating of a desired moisture permeability. The moisture resistance can be varied over a wide range. The resistance increases as more hardener and coating is used. For internal use in humans an 0.75% gum benzoin and 3.0% formalin solution gives a resultant capsule which is comparatively water insoluble, but which releases its contents in the human stomach almost as rapidly as untreated capsules.

By our process, the washing and coating fluid is recoverable with but slight loss.

In the attached drawing, Figure 1 shows a diagrammatic flow sheet of our procedures. Figure 2 shows the final product.

As shown diagrammatically by the flow sheet, filled capsules which have been air dried may be placed in an agitator together with the washing and coating fluid. Either may be added first, as is most convenient.

The washing and coating fluid comprises a solvent, a hardener, and a coating, and may contain a flavoring and perfuming agent if desired. The solvent should be one which is at least somewhat water soluble so that it will wet the gelatin shell which contains both moisture and glycerin. It should be a solvent which is miscible with the formaldehyde, which may be either added as gaseous formaldehyde or a solution of formaldehyde and water (formalin). It must be a solvent for the coating to be used and also for the flavoring or perfuming agent if used.

A typical washing and coating fluid, as illustrated in the drawing, may consist of ethanol as the solvent, from ½ to 10% of formaldehyde as hardener, from ¼ to 5% of gum benzoin as a coating and from ½ to 3% of coumarin as flavor.

It is desired that the solvent have such a density that a properly filled capsule will sink in the solution and an improperly filled capsule, i. e. one which contains air, will float. For this purpose, we find that alcohols, methyl, ethyl, propyl, butyl, benzyl, or their mixtures, etc. are particularly efficacious as are the lower ketones and esters. Mixtures permit closer specific gravity control. We desire to use a fairly volatile solvent so that our product will dry rapidly. A non-toxic solvent is preferred so that if by accident the solvent leaks into a capsule, and is retained, no deleterious effects result.

As a hardener we prefer formaldehyde. Higher aldehydes may be used. The formaldehyde may be added as a gas or in liquid solution. The quantity of aldehyde used may be varied from about ½% to about 10%. The higher concentrations of the aldehyde will give a harder, more slowly soluble final product.

As a coating compound either a natural or synthetic gum or resin may be used. This coating compound should be one which will dry tack-free in air and preferably rapidly. It should be one which is moisture-resistant. Such resins as the silicones, as described in our Patent 2,512,192, June 20, 1950, entitled Silicone Resin Medicament Coating, may be used as may gum benzoin, shellac, gum mastic, gum copal, gum sandarac, coumar resin, styrene-isobutylene copolymers, etc. or mixtures of such materials. It is preferred that a coating be used which will dry tack-free, although shellac and certain of the silicones, etc. which are slightly tacky, are suitable where the tackiness is permitted. From ½ to 5% of the coating material may be present in the solution. The larger percentages are used when a heavier coating is desired.

As a flavoring and perfuming agent, a wide variety of compounds may be used. It is desirable that the flavoring compound or mixtures which may be used be soluble in the solvent and compatible with the other materials present. Such materials as coumarin, vanillin, ethyl vanillin, oil of peppermint or other essential oils may be used, the choice being governed by esthetic considerations. From ½ to 3% gives good results. More may be used for a stronger flavor and odor.

The capsules and the coating fluid are agitated, preferably sufficient of the fluid being used to completely cover the capsules, thereby any soil, dirt, capsule contents, lint, etc. on the surface of the capsule is washed off and removed with the liquid. After a short period of agitation, the mixture is allowed to become quiescent. Any capsules which are defectively filled and are hence lighter than the fluid will be found floating on the surface and may be removed. Under normal operations very few defective capsules will be found. When starting operations, some empty capsule shells are produced. With our method of separation, such capsules are readily separated, so that the first run of capsules may be included in production, and a higher ratio of commercial capsules achieved. In the pharmaceutical trade it is extremely important that any defective capsules be located and removed. This gravity separation serves as a final check to insure that every capsule has its proper weight of fill.

The coating composition and the capsules are then separated. We prefer the use of a centrifuge as thereby a more complete separation of the liquid is easily obtained and by blowing the air through the centrifuge the capsules may be spun dry in a few minutes. The liquid which is separated may be put in a storage tank, then run through a filter and re-used. Any dirt or particles of impurities can be separated on the filter and by adding small quantities of make-up liquid as required, the same washing and coating liquid may be used repeatedly. Fumes from the drying process may be recovered by any of the conventional procedures for solvent recovery and the solvent recycled. A single basket may be used for the agitation, centrifuging and spin-drying operations so that the capsules need not be handled except once as they are fed into the process and once as they are removed. The spinning, handling and other operations should be so conducted as to not mechanically damage the capsules. The finished capsules may be inspected, counted, and packaged. Without limiting our invention to any specific composition or method of treatment, the following illustrate preferred embodiments.

*Example 1*

A high grade of gum benzoin is preferred. This may be tested by dissolving a portion of the gum benzoin in alcohol and allowing the solvent to evaporate on a glass plate. A good quality gum gives a clear, non-tacky coating whereas a poor quality gum gives a cloudy coating and is tacky.

1500 grams of gum benzoin tears (Siam) were pulverized and added to 50 gallons of anhydrous ethyl alcohol. The mixture was agitated for 30 minutes to insure complete solution. 2000 grams of coumarin and 6 liters of 37% aqueous formaldehyde were added to the solution with continued agitation. As a precaution, the resulting solution was filtered. 35 liters of the thus prepared coating solution were placed in an open-top spinning basket and thereto were added approximately 15,000 capsules containing an anti-anemia powder preparation. The capsules were agitated in the solution for about a minute. Agitation was stopped and all floating capsules were removed. The capsules were again agitated for another minute and again checked to insure that all floating capsules had been removed. The basket was then spun at a speed sufficiently high to throw off all liquid in the basket but not mash the capsules, and continued rotating at this speed as dry air was introduced into the basket. The spinning and drying was continued for ten minutes. The removed liquid was passed through the filter and recycled back to be used with the next batch of capsules.

After ten minutes, the capsules were removed from the spinner and found to be clean, dry, non-sticky and ready for packing. On testing, the capsules were found to dissolve in gastric juices at a slightly slower rate than uncoated capsules. The capsules dissolve in much less time than required for passage through the normal human stomach.

*Example 2*

A solution was prepared containing 1500 grams of gum benzoin and 6 liters of 37% aqueous formaldehyde in 50 gallons of anhydrous ethanol. The mixture was stirred until all of the gum benzoin had dissolved, and was then filtered. 35 liters of the solution were placed in an open top spinning basket and 15,000 capsules were added thereto. The capsules were agitated for a minute, the floaters removed, and the liquid spun off by rotating the basket at a sufficiently high speed to centrifuge off the liquid, but not sufficiently high to cause the capsules to be distorted from centrifugal force. Dry air was blown into the spinning basket. After 10 minutes the capsules were dry and had a uniform hard coating of gum benzoin. The formaldehyde had hardened the gelatin and its concurrent action with the deposition of the coating caused the gum benzoin to adhere strongly to the capsule. The capsules as finished were substantially odor free.

A separate washing fluid may be used, and is desirable if large quantities of oil are present on the capsule. A heavy media may be used to float capsules, so that defective capsules will sink, and thus separate both light and heavy capsules. With powder-filled capsules, defective shells will fill and sink with such treatment. Drums and tumblers may be used instead of a centrifuge, with suitable modifications of the coating fluid.

In Figure 2, there is shown diagrammatically a sketch of a finished capsule with a gelatin layer at 11, the reaction product of the formaldehyde and the gelatin coating at 12, and the resin shell at 13. The concurrent presence of the formaldehyde and the coating resin gives a bond between the capsule and its coating that is sufficiently sturdy to stand rough treatment during handling. A filling is shown at 14, and an internal resin coating at 15.

As our invention, we claim:

1. The process which comprises washing and coating soft gelatin capsules with a liquid coating composition, having such a density that properly filled capsules sink therein, comprising an at least partially water soluble, volatile, organic solvent, from ½ to 10% of a lower aldehyde soluble in said solvent as a gelatin hardener, from ¼ to 5% of an air drying resin soluble in said solvent to provide a coating, and a flavor soluble in said solvent, sufficient such composition being present to more than cover the capsules, separating floating capsules, removing the excess liquid coating composition, and drying the coated capsules.

2. The process which comprises washing and coating soft gelatin capsules with a liquid coating composition, comprising an at least partially water soluble, volatile, organic solvent, from ½ to 10% of a lower aldehyde soluble in said solvent as a gelatin hardener, and from ¼ to 5% of an air drying resin soluble in said solvent, to provide a coating, removing the excess liquid coating composition and drying the coated capsules.

3. A process which comprises washing and coating soft gelatin capsules with a liquid coating composition comprising a lower aliphatic alcohol, from ½ to 10% of formaldehyde, from ¼ to 5% of gum benzoin, and a flavor, sufficient such liquid composition being present to more than cover the capsules and said liquid having a composition such that slack-filled capsules will float, separating floating capsules, removing the excess liquid, and drying the remaining coated capsules.

4. The process which comprises washing and coating soft gelatin capsules with a liquid coating composition comprising an at least partially water soluble organic solvent, from ½ to 10% of a lower aldehyde as a gelatin hardener, and from ¼ to 5% of an air-drying resin soluble in said solvent, said composition having such a specific gravity that slack-filled capsules will float, and sufficient such liquid composition being present to more than cover the capsules, separating floating capsules, centrifuging the excess liquid from the remaining capsules and drying the remaining coated capsules by the spinning action of the centrifuge.

5. The process which comprises washing and coating soft gelatin capsules with a liquid coating composition comprising an at least partially water soluble organic solvent, from ½ to 10% of a lower aldehyde as a gelatin hardener, and from ¼ to 5% of an air drying resin soluble in said solvent, separating the excess liquid from the capsules, and air drying the thus coated capsules.

6. The process for soft gelatin capsule finishing which comprises dissolving 3% of 37% aqueous formaldehyde, 0.75% of gum benzoin, and from ½ to 3% of coumarin in anhydrous ethanol, clarifying the solution, adding to the solution filled soft gelatin capsules of such a density that properly filled capsules sink in the thus prepared solution and slack-filled capsules float in the thus prepared solution, in such quantity that the solution more than completely covers the capsules, agitating the capsule-containing solution, permitting the capsule-containing solution to stand so that properly filled capsules sink and slack-filled capsules rise, skimming off the floating slack-filled capsules, centrifuging the excess liquid from the residual capsules at such a speed that the liquid is caused to separate from the capsules but that the capsules are not permanently distorted from the effect of the centrifugal force, and air drying the coated capsules.

7. The process for soft gelatin capsule finishing which comprises dissolving from ½ to 10% of 37% aqueous formaldehyde, from ¼ to 5% of gum benzoin, and from ½ to 3% of coumarin in anhydrous ethanol, clarifying the solution, adding to the solution filled soft gelatin capsules of such a density that properly filled capsules sink in the thus prepared solution and slack-filled capsules float in the thus prepared solution in such quantity that the solution more than completely covers the capsules, agitating the capsule-containing solution, permitting the capsule-containing solution to stand so that properly filled capsules sink and slack-filled capsules rise, skimming off the floating slack-filled capsules, centrifuging the excess liquid from the residual capsules at such a speed that the liquid is caused to separate from the capsules but that the capsules are not permanently distorted from the effect of the centrifugal force, and air drying the coated capsules.

8. The process for soft gelatin capsule finishing which comprises dissolving from ½ to 10% of an aldehyde from the group consisting of the lower aliphatic aldehydes, as a hardener, from ¼ to 5% of a resin coating from the group consisting of gum benzoin, shellac, gum mastic, gum copal, gum sandarac, and coumar resin, and from ½ to 3% of a flavor from the group consisting of coumarin, vanillin, ethyl vanillin, and oil of peppermint in a solvent from the group consisting of lower aliphatic and aromatic alcohols, adding to the solution filled soft gelatin capsules of such a density that properly filled capsules sink in the thus prepared solution and slack-filled capsules float in the thus prepared solution, in such quantity that the solution more than completely covers the capsules, agitating the capsule-containing solution, permitting the capsule-containing solution to stand so that properly filled capsules sink and slack-filled capsules rise, skimming off the floating slack-filled capsules, centrifuging the excess liquid from the residual capsules at such a speed that the liquid is caused to separate from the capsules but that the capsules are not permanently distorted from the effect of the centrifugal force, and air drying the coated capsules.

References Cited in the file of this patent

UNITED STATES PATENTS

| Number | Name | Date |
|---|---|---|
| 629,141 | Weyland | July 18, 1899 |
| 1,683,466 | Horigan | Sept. 4, 1928 |
| 1,778,264 | Lee | Oct. 14, 1930 |
| 1,898,507 | Stein | Feb. 21, 1933 |
| 1,907,203 | Wruble | May 2, 1933 |
| 2,369,592 | Marinsky et al. | Feb. 13, 1945 |
| 2,390,088 | Fox | Dec. 4, 1945 |
| 2,448,320 | McIntosh | Aug. 31, 1948 |
| 2,462,474 | Delano | Feb. 22, 1949 |
| 2,483,598 | Schrank | Oct. 4, 1949 |
| 2,578,943 | Palermo | Dec. 18, 1951 |
| 2,656,298 | Loewe | Oct. 20, 1953 |

FOREIGN PATENTS

| Number | Country | Date |
|---|---|---|
| 13,221 | Great Britain | of 1890 |
| 606,042 | France | June 2, 1946 |

OTHER REFERENCES

Bukey: Jour. of the Am. Pharm. Assn., December 1933, p. 1253.

Hackh: Chemical Dictionary, 2d ed., p. 256.